(12) United States Patent
Hague et al.

(10) Patent No.: US 9,568,104 B2
(45) Date of Patent: Feb. 14, 2017

(54) TORQUE CONVERTER PISTON ASSEMBLY INCLUDING TRANSMISSION INPUT SHAFT SEAL ASSEMBLY

(71) Applicant: Schaeffler Technologies AG & Co. KG, Herzogenaurach (DE)

(72) Inventors: Shane Hague, Doylestown, OH (US); Scott Strong, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 25 days.

(21) Appl. No.: 14/688,293

(22) Filed: Apr. 16, 2015

(65) Prior Publication Data
US 2016/0305550 A1   Oct. 20, 2016

(51) Int. Cl.
*F16J 15/16* (2006.01)
*F16H 45/02* (2006.01)
*B23P 15/10* (2006.01)

(52) U.S. Cl.
CPC ........... *F16J 15/16* (2013.01); *B23P 15/10* (2013.01); *F16H 45/02* (2013.01); *F16H 2045/0294* (2013.01)

(58) Field of Classification Search
CPC ............ F16H 45/02; F16H 2045/0205; F16H 2045/0294
See application file for complete search history.

(56) References Cited

U.S. PATENT DOCUMENTS

| | | | |
|---|---|---|---|
| 4,721,312 A | 1/1988 | Hornberger | |
| 2008/0156129 A1* | 7/2008 | Degler | F16H 45/02 74/411 |
| 2008/0191422 A1 | 8/2008 | Schoenek | |
| 2009/0257699 A1 | 10/2009 | Hosaka et al. | |
| 2012/0011838 A1 | 1/2012 | Lindemann | |
| 2012/0266589 A1* | 10/2012 | Avins | F16F 15/1207 60/330 |
| 2013/0319221 A1* | 12/2013 | Steinberger | F16J 1/02 92/172 |

(Continued)

FOREIGN PATENT DOCUMENTS

EP   1288537 B1   1/2007

OTHER PUBLICATIONS

International Search Report and Written Opinion for Corresponding PCT Application.

*Primary Examiner* — Jacob S Scott
(74) *Attorney, Agent, or Firm* — Davidson, Davidson & Kappel, LLC

(57) ABSTRACT

A piston assembly for a torque converter is provided. The piston assembly includes a seal assembly including an inner ring configured for fixing to an outer circumferential surface of a transmission input shaft. The seal assembly also includes an outer ring on an outer circumferential surface of the inner ring. The piston assembly also includes a lock-up clutch piston including a radially inner end engaging the seal assembly. A method of forming a piston assembly for a torque converter is also provided. The method includes providing an outer ring on an outer circumferential surface of an inner ring to form a seal assembly configured for fixing to an outer circumferential surface of a transmission input shaft and connecting the seal assembly to a radially inner end of a lock-up clutch piston.

16 Claims, 1 Drawing Sheet

(56) References Cited

U.S. PATENT DOCUMENTS

| 2014/0345997 | A1* | 11/2014 | Gerdeman | F16D 33/18 |
| | | | | 192/3.28 |
| 2015/0152949 | A1* | 6/2015 | Avins | F16H 41/24 |
| | | | | 60/330 |
| 2015/0247538 | A1* | 9/2015 | Cerreta | F16J 15/16 |
| | | | | 192/3.33 |

* cited by examiner

TORQUE CONVERTER PISTON ASSEMBLY INCLUDING TRANSMISSION INPUT SHAFT SEAL ASSEMBLY

The present disclosure relates generally to torque converters and more specifically to lock-up clutch pistons.

BACKGROUND

U.S. Publication No. 2012/0011838 discloses a plurality of hub seal assembly designs.

SUMMARY OF THE INVENTION

A piston assembly for a torque converter is provided. The piston assembly includes a seal assembly including an inner ring configured for fixing to an outer circumferential surface of a transmission input shaft. The seal assembly also includes an outer ring on an outer circumferential surface of the inner ring. The piston assembly also includes a lock-up clutch piston including a radially inner end engaging the seal assembly.

A method of forming a piston assembly for a torque converter is also provided. The method includes providing an outer ring on an outer circumferential surface of an inner ring to form a seal assembly configured for fixing to an outer circumferential surface of a transmission input shaft and connecting the seal assembly to a radially inner end of a lock-up clutch piston.

BRIEF DESCRIPTION OF THE DRAWINGS

The present invention is described below by reference to the following drawings, in which.

DETAILED DESCRIPTION

Figures 1, 2, 3:
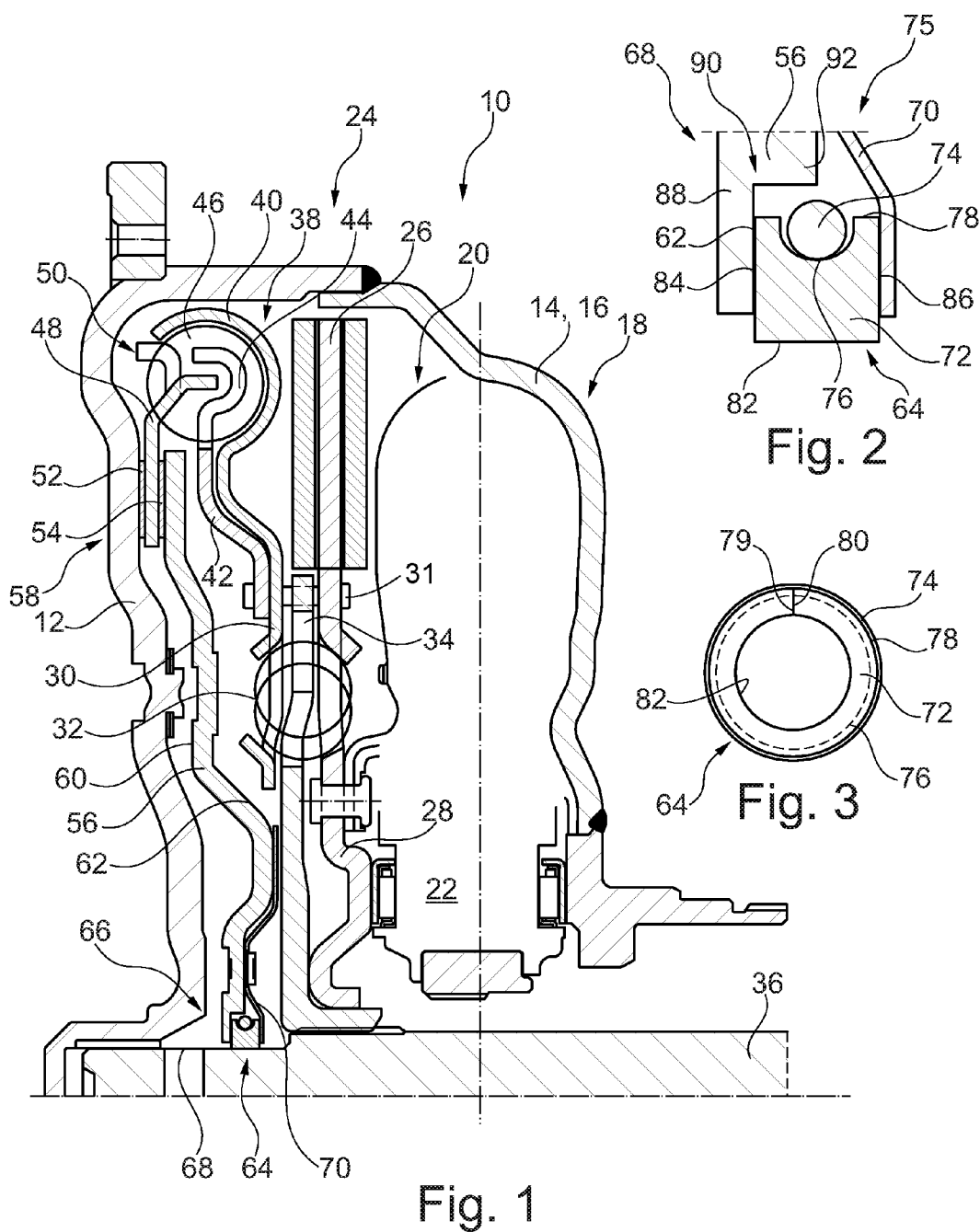
FIG. 1 schematically shows a cross-sectional side view of a torque converter in accordance with an embodiment of the present invention.
FIG. 2 schematically shows an enlarged view of portion of a piston assembly of the torque converter shown in FIG. 1.
FIG. 3 schematically shows a side view of a seal assembly of the torque converter shown in FIG. 1.

The disclosure provides a dynamic seal, for example a split teflon ring with a groove for receiving an o-ring surrounding its outer circumference. The o-ring may counteract problems of seal growth due to temperature and/or misalignment that lead to high flow and delayed clutch response. In another embodiment, a groove for receiving the seal may be formed directly on the transmission input shaft.

FIG. 1 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 opposite impeller 18 and a stator 22 axially between impeller 18 and turbine 20. On a front-cover side of turbine 20, turbine 20 is connected to a damper 24.

Damper 24 includes a centrifugal pendulum vibration absorber 26 riveted to turbine 20 by a first cover plate 28. Damper 24 further includes a second cover plate 30 riveted to first cover plate 28 by a rivet 31, with cover plates 28, 30 supporting a plurality of circumferentially spaced radially inner set of springs 32 axially therebetween. Cover plates 28, 30 transfer torque from turbine 20 to a drive flange 34 axially between cover plates 28, 30 via springs 32. Drive flange 34 in turn drives a transmission input shaft 36. At a radially outer end thereof, second cover plate 30 includes a spring retainer 38 formed by a rounded outer circumference 40 of cover plate 30 and a retainer plate 42 riveted to second cover plate 30 by rivet 31. Retainer plate 42 includes a plurality of circumferentially spaced outer tabs 44 at the radially outer end thereof that define circumferentially extending spaces, each for receiving one of a plurality of circumferentially spaced radially outer set of springs 46 of damper 24. Springs 46 in turn drivingly engage a clutch plate 48 via circumferentially spaced outer tabs 50 of clutch plate 48, each for extending into one of the spaces circumferentially between springs 46.

At a radially inner end thereof, clutch plate 48 includes friction material 52, 54 on axial sides thereof. Front cover side friction material 52 is arranged for engaging an inner surface of front cover 12 and rear cover side friction material 54 is arranged for engaging a radial outer end of a piston 56. Piston 56 and clutch plate 48 form a lockup clutch 58 for drivingly coupling turbine 20 to front cover 12 via damper 24. Fluid pressure differences between a front cover side 60 of piston 56 and a rear cover side 62 of piston 56 control whether clutch plate 48 engages or is disengaged from front cover 12 via piston 56.

A seal assembly 64 in accordance with an embodiment of the present invention is positioned at a radially inner end 66 of piston 56 such that radially inner end 66 of piston engages seal assembly 64. Seal assembly 64 is configured for sealingly connecting piston 56 to an outer circumferential surface 68 of transmission input shaft 36. A seal retaining plate 70 fixed to rear cover side 62 of piston 56 helps piston 56 axially retain seal assembly 64 between seal retaining plate 70 and a radially inner end 66 of piston 56. In other words, seal assembly 64 is forced axially into rear cover side 62 of piston 56 by seal retaining plate 70. Together, seal assembly 64, piston 56 and seal retaining pate 70 form a piston assembly 75.

FIG. 2 schematically shows an enlarged view of a portion of piston assembly 75. Seal assembly 64 includes an inner ring 72 and an outer ring 74. Inner ring 72 is configured for fixing to outer circumferential surface 68 of transmission input shaft 36 and includes a circumferentially extending groove 76 formed in outer circumferential surface 78 thereof that is annularly shaped and configured for receiving outer ring 74. In this embodiment, inner ring 72 is a split ring and outer ring 74 is an o-ring. Accordingly, as shown in the schematic side view of seal assembly 64 illustrated in FIG. 3, inner ring 72 is not circumferentially contiguous and is split to define a first circumferential end 79 and a second circumferential end 80. Outer ring 74 is arranged at outer circumferential surface 68 in groove 76 and limits separation of the first and second circumferential ends 79, 80 to maintain the outer contour of inner ring 72. Advantageously, outer ring 74 limits temperature induced expansion of inner ring 72 and may counter act seal growth from misalignment of inner ring 72 on transmission input shaft 36. In one preferred embodiment, inner ring 72 is formed of Teflon and outer ring 74 is formed of a compliant material such as rubber.

Inner ring 72 includes a cylindrically shaped axially extending inner circumferential surface 82 for sealingly contacting outer circumferential surface 68 of transmission input shaft 36 and two radially extending surfaces 84, 86 extending radially from inner circumferential surface 82 to outer circumferential surface 78. Front cover side radially extending surface 84 sealingly axially contacts rear cover side 62 of piston 56 at a radially inner thinned section 88 of piston 56 and rear cover side radially extending surface 86 sealingly axially contacts a front cover side of seal retaining plate 70.

Torque converter 10 may be assembled by installing outer ring 74 on outer circumferential surface 78 of inner ring 72 in circumferentially extending groove 76 to form seal assembly 64, then aligning seal assembly 64 in a step 90 of piston 56, which defined by thinned section 88 and radially adjacent section 92 that is thicker than thinned section 88. Seal retaining plate 70 may then be fixed to rear cover side 62 of piston 56 such that seal assembly 64 is axially sandwiched between piston 56 and seal retaining plate 70. Transmission input shaft 36 may then be inserted into seal assembly 64.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A piston assembly for a torque converter comprising:
   a seal assembly including an inner ring configured for fixing to an outer circumferential surface of a transmission input shaft, the seal assembly also including an outer ring on an outer circumferential surface of the inner ring; and
   a lock-up clutch piston including a radially inner end engaging the seal, the inner ring being split and including first and second circumferential ends, the outer ring being an o-ring arranged for limiting separation of the first and second circumferential ends of the inner ring, the outer ring limiting temperature induced expansion of the inner ring.

2. The piston assembly as recited in claim 1 wherein the inner ring includes a circumferentially extending groove on the outer circumferential surface thereof, the outer ring being received in the circumferentially extending groove.

3. The piston assembly as recited in claim 2 wherein the inner ring includes a cylindrically shaped axially extending inner circumferential surface for sealingly contacting the outer circumferential surface of the transmission input shaft and two radially extending surfaces extending radially from the inner circumferential surface to the outer circumferential surface of the inner ring, the circumferentially extending groove of the inner ring being between the two radially extending surfaces.

4. The piston assembly as recited in claim 1 wherein the outer ring is formed of a compliant material.

5. The piston assembly as recited in claim 1 wherein the inner ring is formed of Teflon.

6. The piston assembly as recited in claim 1 wherein the radially inner end of the lock-up clutch piston is axially held against a radially extending surface of the inner ring.

7. The piston assembly as recited in claim 1 further comprising a seal retaining plate fixed to the lock-up clutch piston, the seal retaining plate holding the seal assembly on the lock-up clutch piston.

8. A torque converter comprising the piston assembly as recited in claim 1.

9. The piston assembly as recited in claim 1 wherein the outer ring does not contact the piston.

10. The method as recited in claim 1 wherein an outermost circumferential surface of the outer ring is radially outside of an outermost circumferential surface of the inner ring.

11. A method of forming a piston assembly for a torque converter comprising:
    providing an outer ring on an outer circumferential surface of an inner ring to form a seal assembly configured for fixing to an outer circumferential surface of a transmission input shaft, the inner ring including a cylindrically shaped axially extending inner circumferential surface for sealingly contacting the outer circumferential surface of the transmission input shaft and two radially extending surfaces extending radially from the inner circumferential surface to the outer circumferential surface of the inner ring, the inner ring including a circumferentially extending groove on the outer circumferential surface thereof between the two radially extending surfaces, the outer ring being provided in the circumferentially extending groove; and
    connecting the seal assembly to a radially inner end of a lock-up clutch piston.

12. The method as recited in claim 11 wherein the inner ring is split and includes first and second circumferential ends.

13. The method as recited in claim 12 wherein the outer ring is an o-ring provided on the outer circumferential surface of an inner ring for limiting separation of the first and second circumferential ends of the inner ring.

14. The method as recited in claim 11 wherein the connecting the seal assembly to the radially inner end of the lock-up clutch piston includes holding the radially inner end of the lock-up clutch piston axially against a radially extending surface of the inner ring.

15. The method as recited in claim 11 wherein the connecting the seal assembly to the radially inner end of the lock-up clutch piston includes fixing a seal retaining plate to the lock-up clutch piston such that the seal retaining plate holds the seal assembly on the lock-up clutch piston.

16. A piston assembly for a torque converter comprising:
    a seal assembly including an inner ring configured for fixing to an outer circumferential surface of a transmission input shaft, the seal assembly also including an outer ring on an outer circumferential surface of the inner ring; and
    a lock-up clutch piston including a radially inner end engaging the seal assembly, wherein the radially inner end of the lock-up clutch piston is axially held against a radially extending surface of the inner ring.

\* \* \* \* \*